Nov. 5, 1968   J. F. BLACK   3,409,220
CLOUD FORMATION AND SUBSEQUENT MOISTURE PRECIPITATION
Filed March 26, 1965   3 Sheets-Sheet 1
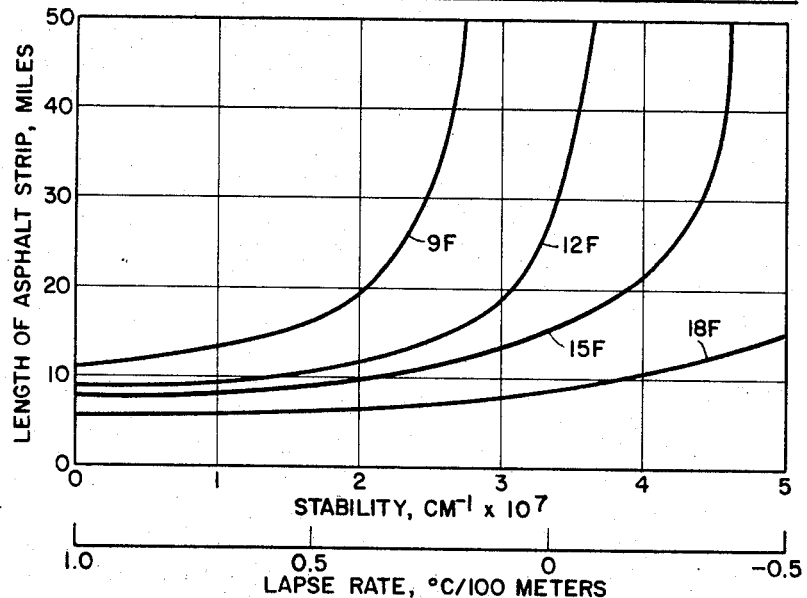
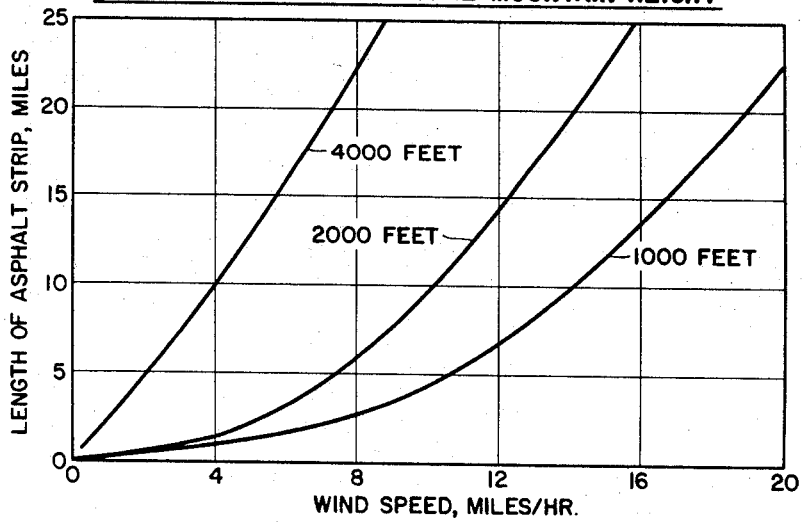
JAMES F. BLACK Inventor
By Henry Berk
Patent Attorney

LINES OF CONSTANT MIXING LENGTH

Nov. 5, 1968  J. F. BLACK  3,409,220
CLOUD FORMATION AND SUBSEQUENT MOISTURE PRECIPITATION
Filed March 26, 1965  3 Sheets-Sheet 3

JAMES F. BLACK   Inventor

By *Henry Berk*

Patent Attorney

United States Patent Office 3,409,220
Patented Nov. 5, 1968

3,409,220
CLOUD FORMATION AND SUBSEQUENT
MOISTURE PRECIPITATION
James F. Black, Convent, N.J., assignor to Esso Research and Engineering Company, a corporation of Delaware
Continuation-in-part of applications Ser. No. 129,107, Aug. 2, 1965, and Ser. No. 233,377, Oct. 26, 1965. This application Mar. 26, 1965, Ser. No. 443,059
3 Claims. (Cl. 239—2)

This application is a continuation-in-part of Ser. No. 129,107 filed Aug. 3, 1961, which was abandoned Nov. 2, 1962, and Ser. No. 233,377 filed on Oct. 26, 1962, and now abandoned.

The present invention is directed to a method of modifying weather over land masses. In particular, the instant invention is directed to a method of causing a thermal temperature gradient which will effect a cloud formation with a subsequent precipitation of moisture from such formation. This invention has special application to the situations where moisture-laden air can be moved over land areas which are rather arid and near the coast so as to form clouds and to cause precipitation over inland arid areas.

A serious problem facing the world today is the lack of precipitation in large areas of the world. The lack of precipitation is partly the result of the lack of proper movement of air masses having a moisture content. Moisture-laden air does move over certain areas without the precipitation of such moisture and the areas thus become useless for agricultural purposes not due to the lack of fertile soil but due to the lack of rain. Many such areas are relatively near oceans and other large bodies of water but, nevertheless, they are highly deficient in rainfall.

It has now been found that by inducing updrafts large masses of moisture-laden air can be raised to heights at which cloud formation and condensation will occur. By this process rainfall and other forms of precipitation may be increased over a given area of land. By the means of the instant process, it becomes possible to rehabilitate or render arable, large areas of land which at present are relatively worthless waste or marginal grazing lands. Thus, some of the world's great desert and arid areas may be rendered productive by an increase of precipitation.

According to the present invention, the foregoing problems and others which are analogous, may be solved in substantial degree by coating selected large and extensive areas of land, i.e., at least 5 or 10 and, in some cases, as much as 100 square miles, with a material which is a highly efficient absorber of solar radiation. The land surface to be coated may be upsloping such as hillsides, mountain ravines, etc. or it may be flat. It may be coated continuously or discontinuously with radiation absorbing materials which are substantially different in absorptive and/or radiating properties from adjoining areas. In many cases, coatings of black material, such as asphalt and related compositions, may be used as these normally absorb considerably more solar radiation than normal soils and rocks. Asphalt is preferred over most materials for reasons of economy, but other materials can be used. A reverse effect may be created by using white, or near white, reflective materials, such as powdered gypsum, limestone, calcined lime and the like, to coat extensive areas and thereby create relatively cooler areas which may cause downdrafts. These coatings also may be employed in relation to neighboring black coated areas or may be used alone in some cases to augment the lateral flow as well as the downflow of large air masses.

It will be understood that the invention contemplates a strong "triggering" action by the thermal effect of the surface coating. While weather phenomena and mass air flow are but partially understood, the following explanation will help in understanding the invention. Air cools as it rises, the rate of cooling being in the general range of about 1° C. per 100 meters rise. Clouds form as the water vapor in the air condenses when the ascending air reaches its dewpoint. This condensation is accompanied by strong release of energy (latent heat of evaporation), which causes the air to rise even more vigorously and may cause strong updrafts carrying the resulting cloud top to high altitudes. In summertime the "thunderheads" which commonly presage violent rainstorms are commonly understood to be produced by such mechanism. By starting an updraft, due to heating air near the ground by radiation and conduction from an extensive black surface, the air may be pushed vigorously up to where condensation starts to form clouds. The energy released by the condensation itself then pushes the cloud more rapidly to greater heights.

The moisture-laden air moving inland from a large body of water can be induced to precipitate its moisture content, or part of its moisture content, by increasing the altitude of the air mass. This can be done by placing a large body in its path. In this regard it is to be noted that mountain ranges juxtaposed to seacoasts enjoy a greater rainfall than extensive plains which abut seacoasts. One can but look to the coastline of Libya and note that the rainfall is almost nonexistent where the plain abuts the coast. However, in the mountainous region of eastern Libya it is noted that the rainfall is quite heavy. It has been found that though erecting physical structures is highly impractical, the same effect can be accomplished by creating thermal updrafts. These thermal updrafts, in effect, create air movement patterns similar to those over an actual mountain mass. It has now been found that these thermal mountains, as it were, can be created by creating thermal updrafts in the path of moisture-laden air masses. As hereinbefore set forth, these thermal updrafts can best be effected by placing an asphalt covering upon the ground such that the prevailing moisture-laden winds will traverse a distance over the asphalt covering of from about 1 to 40 miles. The distance over which the moisture-laden air must travel in order to elevate it sufficiently to cause cloud formation and precipitation of the moisture will depend upon the velocity of the wind, the temperature advantage of the asphalt strip, the temperature profile in the atmosphere, the humidity profile, and the amount of water to be deposited upon the land to be made arable.

The invention will be more fully understood by referring to the accompanying drawings wherein:

FIGURE 1 is a graph comparing the effect of length of asphalt, temperature advantage and atmospheric stability in producing a thermal mountain of 2,000 ft. effective height.

FIGURE 2 is a graph relating the length of the asphalt strip to wind speed for certain selected thermal mountain heights.

Figure 5:
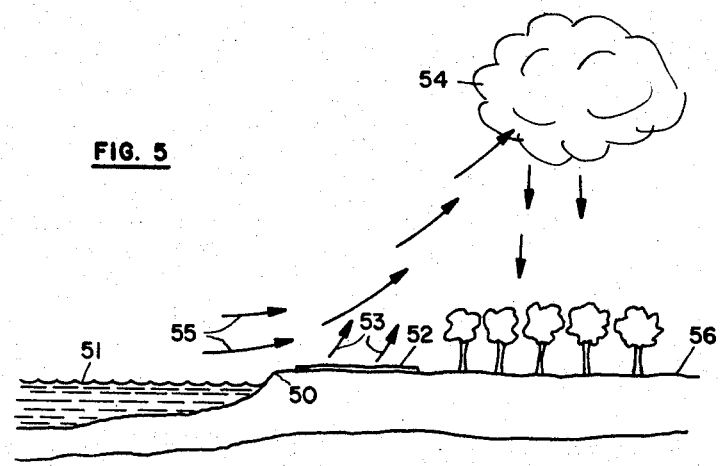
Figure 6:
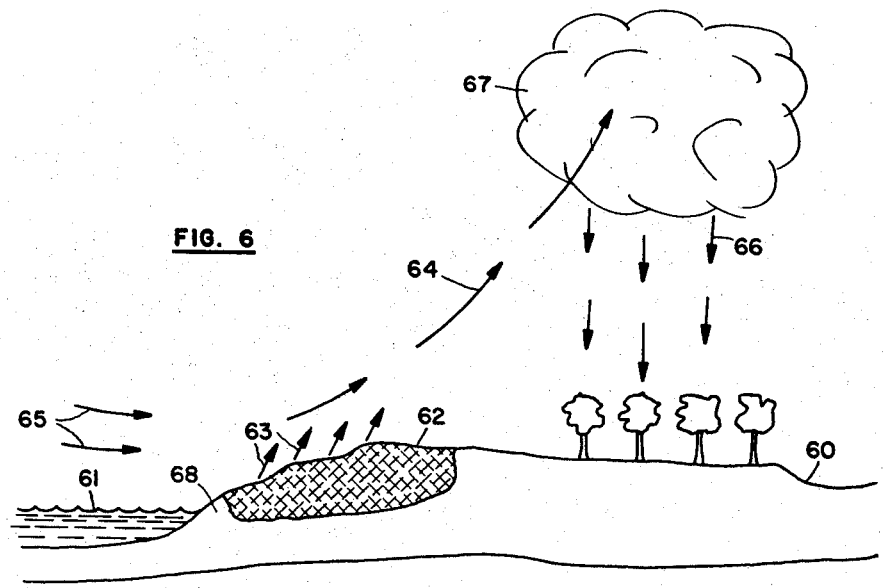

FIGURE 5 is a profile view of the situation whereby application of material having substantially greater absorption properties for solar radiation than the general land area, air mass may be moved upwardly from an adjacent body of water to form clouds with resulting precipitation, and FIGURE 6 shows in profile an application to a hilly area adjacent to a body of water, an asphalt coating which, with the aid of the upland area causes moisture-laden air to rise to a sufficient altitude to form clouds and form precipitation over an inland area.

Referring in more detail to the drawings, in FIGURE 1 there is depicted a graphic representation of the influence of atmospheric stability upon the asphalt strip length needed to produce a 2,000 ft. thermal mountain. The stability scale is also presented in terms of lapse rate which is a more familiar term in the art. The different curves set forth on the graph are based upon the temperature advantage of the asphalt in ° F. It is known that the temperature advantage for asphalt may be as great as 27°. However, only very readily obtainable temperature advantages are set forth, that is, 9, 12, 15 and 18° F. In making the calculations for the graph, wind speed was deemed to be 12.1 miles/hour and the mixing length was taken as 16.4 ft. The data from the FIGURE 1 show that with only a 9° F. advantage, the asphalt coating requirements are not excessive and for lapse rates of the order of 0.4° C./100 meters, if an 18° F. temperature advantage can be realized it is to be realized that a 2,000 ft. thermal mountain can be caused even in the presence of a moderate temperature inversion. Such is, of course, of importance since certain coastal areas have such temperature inversions.

Referring now to FIGURE 2, there is shown the effect of wind speed upon the length of the asphalt strips. It can readily be seen that the amount of asphalt needed to produce a mountain of a given elevation increases rapidly with increasing wind speed. The data for FIGURE 2 involves the conditions of 9° F. asphalt advantage, a stability of $10^{-7}$ cm.$^{-1}$ (0.4° C./100 m. lapse rate) and a mixing length of 16.4 ft. Under the conditions of the data for FIGURE 2 it is to be seen that mountains higher than 2,000 ft. will require an almost linear increase in asphalt per increase of mile per hour of wind speed. Mountain heights of less than 2,000 ft. have a very slight slope up to about 5 miles/hour. It is found that a mountain height above which asphalt requirements begin to become large will vary inversely with the temperature advantage, this is, if the temperature advantage is 18° F. rather than the 9 used in making the data for FIGURE 2, the curves, rather than being 1,000, 2,000, and 8,000, would approach double those values for substantially the same curve.

Figure 3:
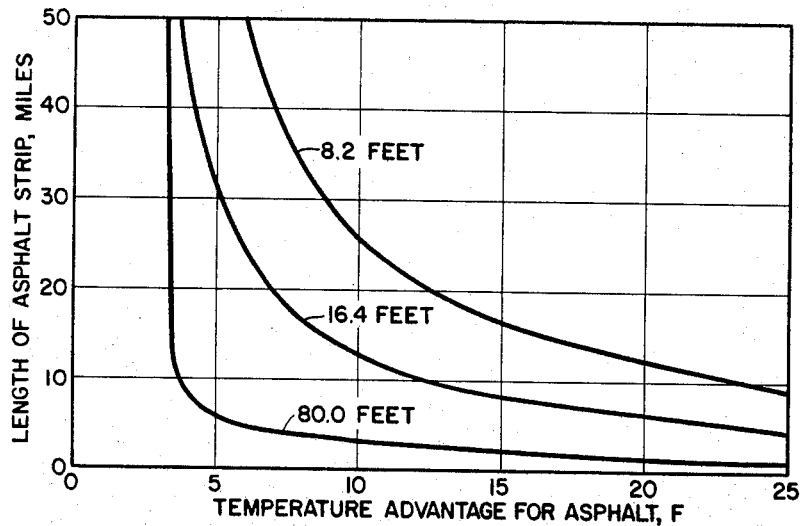
FIGURE 3 is a chart depicting the relationship of length of asphalt strip to the temperature advantage of asphalt.

FIGURE 3 is a comparison of the temperature advantage and mixing length of asphalt for the length of the asphalt needed to create a thermal mountain of 2,000 ft. wherein the wind speed is 12.1 miles/hour and the stability is at $10^{-7}$ cm.$^{-1}$. It has been found that mixing lengths are conversely proportional to the length of the asphalt strip. However, the importance of the mixing length is reduced when large asphalt strips of more than 30 miles in length are employed, that is, the comparison of mixing length and temperature advantage to length of asphalt strip simply becomes a direct comparison between temperature and length at about 30 miles of asphalt. The temperature advantage of asphalt will generally range from about 8 to 20° F. However, differences as great as 27° F. are not uncommon. The size of the asphalt coating is sensitive to changes in temperature advantage at the extremes, that is, when the temperature advantage becomes quite large the length of the asphalt strip required becomes smaller and, conversely, a small temperature advantage would require an inordinately large asphalt coating. The temperature advantage of the asphalt is simply the difference in temperature between the asphalt coating and the surrounding land mass. It is to be noted from FIGURE 3 that the length of asphalt required for a normal temperature advantage of between 10 and 20° F. is not great; in fact, it will vary at most by only a factor of 2.

Figure 4:
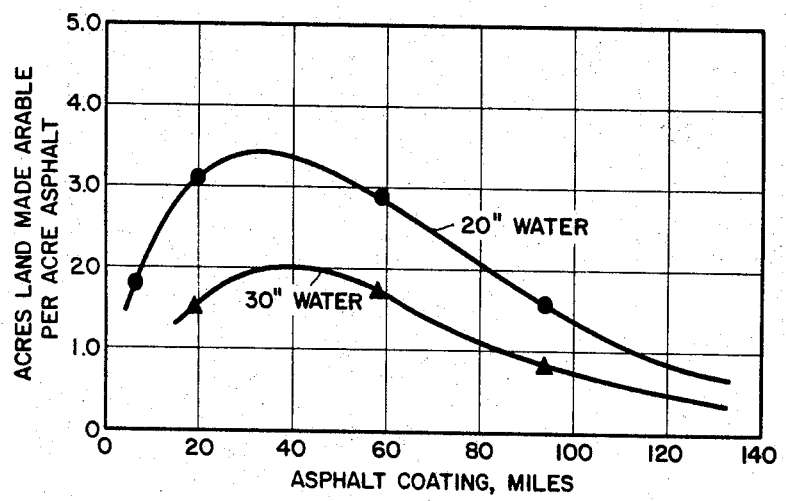
FIGURE 4 is a diagram comparing the amount of asphalt coating in miles to the ratio of acres of land made arable to acres of asphalt.

FIGURE 4 is a graphic presentation of the ratio of land made arable to acres of asphalt compared with the length of the asphalt coating. There are shown two different curves, one curve representing the comparison when the land made arable is required to receive an average 20″ of rain per year and the second line depicting the comparison when the land made arable is required to receive an average 30″ of rainfall. These curves are based upon a thermal mountain created by an asphalt strip 19 miles long over which a wind having speed of 12.1 miles/hour is blowing. The thermal mountain is created by this asphalt strip having a temperature advantage of 9° F. The stability of the atmosphere is taken at $10^{-7}$ cm.$^{-1}$. This thermal mountain has the same general profile as the actual mountain of about 2,000 ft. altitude, previously mentioned, in eastern Libya. The 30″ curve is based upon the amount of land over which 30″/year of water would be made available by collecting rainfall from an area in which the precipitation is at least 15″/year. In the case of the 20″ curve this is the amount of usable land as defined by the area over which 20″ of water would be made available by collecting rainfall from areas which receive 10″/year or more of rain. The maximum amount of arable land per acre of asphalt is reached when the length of asphalt is about 35 miles. Further increases in the length of the asphalt have little beneficial effect.

Referring now to FIGURE 5, a situation is shown which applies to land areas having no substantial hills near a seacoast 50. An area 52 may be coated near the water 51 to cause updrafts 53 with cloud formation 54. The normal sea breezes 55 move the clouds landward and condensation causes rain to fall over area. 56. The distance 50 between the body of water 51 and the coated area 52 can vary from several feet to several miles. This distance will vary depending upon the distance the area to be watered lies from the body of water.

As previously noted, the materials presently preferred for the heat absorbing and radiating coating are the heavy residual petroleum oils and asphalt. Asphalt and related normally solid or plastic materials derived from petroleum residues are relatively inexpensive and are especially preferred. Among the various forms of asphalt, the aqueous emulsions, either acidic or alkaline, are presently preferred for reasons of economy and ease of application. Cutbacks may be used, or emulsified cutbacks. For example, a square mile of surface may be coated with a thin layer of emulsion for a cost under $20,000. By application of sufficiently large areas of a highly heat-absorbent and radiative coating to sites which are properly selected, very substantial rising air currents may be created during daylight hours.

In the case of FIG. 5, for example, the coated area should extend for at least one and preferably, three or more, miles in depth and at least one mile along the coast. It should be within five or ten miles of the coast if possible. Resulting updrafts 53 are then on a sufficiently large scale to cause incipient condensation and formation of rain clouds 54. These clouds are swept inland by the normal landward breezes 55, causing rainfall over area 56.

By calculations based on known data of temperature, moisture content of air, and heat effects, it can be shown that precipitation over an area such as 56 can be increased by as much as 20 inches per year, and the increased precipitation can be extended over an area up to three times as large or larger as the coated area 52.

By coating suitably extensive areas of hillsides to create major updrafts or chimney effects, substantial masses of moisture-laden air may be moved inland at relatively small expense compared with the benefits. Hills or upsloping areas are advantageous but even where there are no substantial hills nearby, large mass air movements can be produced by coating suitable areas, provided that landward breezes are available to move moisture-laden air overlying a body of water towards the area to be coated. An example of an application to an upland area near a body of water is shown in FIG. 6.

A rainfall-deficient area 60, FIG. 6, is shown within reasonable distance of a large body of water 61, and may be made arable by coating a substantial area 62 near, or within a few miles, from the water's edge with a strongly light absorbing material such as an asphalt emulsion. An updraft 63 from the coated area initiates a strong thermal upflow 64 and lifts warm moist air 65. As it rises it condenses to clouds 67. These, meanwhile, are normally moving inland with the seabreezes, and rain falls inland from the coated area. The coated area 62 will be located a distance 68 of from several feet to several miles from the body of water 61. The distance 68 will depend upon the distance the area to be watered lies from the body of water. The coating material will gradually disintegrate but a good coating properly applied will last several years on many soils, in some cases as long as ten years or more. In particular, with stable soil or rock surface conditions, where wind and water do not cause much erosion or soil movement, a single, thin application of such a coating as acidic or basic emulsion of asphalt may last for quite a number of years before requiring renewals, as far as its effects on air currents are concerned.

The lifetime and effectiveness of the coating, particularly when it involves asphalt or residual petroleum materials, may be substantially increased by incorporating therein materials which prevent deterioration, or which inhibit or destroy the causes of deterioration. Thus herbicides may be incorporated in the coating itself to prevent growth of vegetation through the coating. The coating may include antioxidants. In general, materials inimical to all organic life are contemplated. In some cases coating materials such as certain types of asphalt material are subject to extensive attack by animal life. Biological poisons or repellents may be added under suitable circumstances to prevent or reduce attack by insects, including those in the larva state and, in fact, may be extended to prevent attack by larger animate life such as birds and animals.

In some circumstances it may be desirable to fense in the area which is coated to keep out animals, or to reduce or restrict the movement of drifting sand and other material which might obscure or obliterate the coating. An analogous effect can be achieved by establishing a poison or inhibitor zone around the margin of a coated area, for example, to minimize or prevent encroachment of animal or vegetable life into such area.

In lieu of actual poisons, which might be unduly destructive of certain types of wild life, there are available various repellent materials which may be employed to discourage animal or insect attack.

Where possible, the dark colored coating material will be applied to the higher ground, preferably above the inversion level, where an inversion is involved.

In the prior art a technique is well known for precipitating moisture from clouds by "cloud seeding." The present invention contemplates, in addition to the coating of large ground areas with black, or relatively black, material to produce strong thermal updrafts and facilitate cloud formation, the use of the cloud seeding technique as an auxiliary measure when such appears desirable. Finely divided particles to be employed for cloud seeding may actually be distributed high in the air prior to actual cloud formation, if desired, so that as they slowly descend and disperse, they may reach the cloud and begin their effect when the cloud is in approximately the desired position to produce rainfall. The present invention gives a much better control over the placing of rainfall than simple cloud seeding per se, even when the latter is effective. By coordinating the timing of the cloud seeding with rspect to the updraft produced from the black surface and the lateral air mass travel due to wind or due to a combination of wind and updraft, moisture may be precipitated in substantial quantities and in approximately the areas most desired.

The cloud seeding materials and procedures are known in the art and comprise such materials as finely divided silver iodide, solid carbon dioxide, carbon black, ice crystals and other solid substances capable of promoting condensation of the cloud moisture into raindrops. By the technique just described, rain sometimes may be produced in a cloud which otherwise would not quite reach the point of incipient precipitation. Obviously, the employment of a cloud seeding procedure is useless if there are no clouds or if there is insufficient moisture in the atmosphere to produce precipitation. The method of causing large updrafts to cause cloud formation, as described above, greatly enhances the possibility of producing controlled precipitation. The combination of these two techniques gives a flexibility and opportunity for large scale weather control not previously available.

Obviously, some of the areas within suitable distance of the lands to be watered may be coated with relatively white or nonradiating materials, such as lime, gypsum, etc., as described above, to augment or modify the air mass effects. However, the strong updrafts arising from areas which are black to sunlight are normally sufficiently effective and these are ordinarily the predominating factor.

The following example is submitted in order to more particularly point out applicant's invention and is not to be construed as a limitation upon the scope of the invention as set forth in the appended claims.

*Example*

In order to effect precipitation conditions of an air mass of about 86° F. and a relative humidity of about 70%, it would be necessary to lift the air about 1,500 ft. Thus in order for our process to be effective, the asphalt coating must provide at least a lift of 1,500 ft. under such conditions. The lift given to an airstream produced by an asphalt coating may be determined by utilizing the following expression:

$$M = \frac{T}{ST_m}\left[1 - \exp\left\{-\left(\frac{K}{U}\right)\left(\frac{gS}{U^2}\right)L\right\}\right]$$

where $M$ = the lift given to the air stream
$U$ = the velocity of the air flowing over the coated differentially heated surface
$K$ = the eddy diffusivity of the air stream
$S$ = the stability of the air (difference between adiabatic and actual lapse rates)
$T$ = the ground temperature increase caused by the asphalt coating
$T_m$ = the temperature of the air stream, and
$L$ = the length of the coating (in the direction of windflow).

Even assuming a very conservative estimate for T of 9° F. the lift derived by a coating of only 10 miles will be 1,200 to 2,600 ft. for value of $U = 1.7$ to 5.0 meters per second. $K = 8 \times 10^5$ to $7 \times 10^6$ cm.$^2$/sec. and $S = 1 \times 10^{-7}$ to $2.5 \times 10^{-7}$ cm.$^{-1}$. Thus a coating having the aforesaid dimensions would provide more than the adequate lift to cause the moist air to rise and precipitate its moisture content or part of its moisture content.

In view of the temperature advantages which would normally be expected in the arid costal areas wherein the invention may be used to best advantage, the temperature advantage of the asphalt will, in all probability, be 30–40° F. and in these cases lifts of as high as 5,000 ft. can be effected with coatings of about 10 miles square. Therefore, since lifts as high as 5,000 ft. are not necessary in order to effect precipitation, considerably smaller areas can be coated with asphalt in order to effect precipitation in semitropical areas or in areas having daytime temperatures of above 80° F.

What is claimed is:

1. A method of causing cloud formation and moisture precipitation over a relatively arid land mass which comprises coating an area of land for a distance of at least several miles in a direction substantially parallel to the direction of the prevailing winds and at least one mile in a direction perpendicular to the prevailing winds with a material of high absorptivity to solar radiation to cause an updraft such as to lift large masses of relatively humid air over said arid land mass wherein said coating is located within at least ten miles of a body of water and between said body of water and said arid land mass and wherein said coating is substantially continuous.

2. A method as in claim 1 wherein said coating material consists essentially of asphalt.

3. A method as in claim 1 wherein the distance of said coating in the direction substantially parallel with the prevailing winds is a distance of from 1 to 40 miles.

References Cited

UNITED STATES PATENTS

| | | | |
|---|---|---|---|
| 1,882,377 | 10/1932 | Whittelsey | 47—9 |
| 2,268,320 | 12/1941 | Brandt | 239—14 |
| 3,036,015 | 5/1962 | Woodward | 252—311.5 |

OTHER REFERENCES

Science—vol. 126, July–December 1957, pp. 637–645.
Weather Modification and Smog, by M. Nieburger. (Copy is in the Scientific Library of The Patent Office.)

EVERETT W. KIRBY, *Primary Examiner.*